(12) United States Patent  (10) Patent No.: US 7,409,086 B2
Bai et al.  (45) Date of Patent: Aug. 5, 2008

(54) SEGMENTATION OF IMAGE DATA

(75) Inventors: Yingjun Bai, Webster, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 766 days.

(21) Appl. No.: 10/719,395

(22) Filed: Nov. 21, 2003

(65) Prior Publication Data

US 2005/0111731 A1  May 26, 2005

(51) Int. Cl.
*G06K 9/34* (2006.01)
(52) U.S. Cl. ....................... 382/173; 382/199
(58) Field of Classification Search ................ 382/164, 382/171, 173, 174, 176, 199, 232, 236, 283, 382/260, 264; 345/467
See application file for complete search history.

(56) References Cited

U.S. PATENT DOCUMENTS 4,539,704 A * 9/1985 Pastor ........................ 382/258
5,778,092 A   7/1998 MacLeod et al. ............ 382/176
6,173,075 B1 * 1/2001 Collins ....................... 382/203
6,240,205 B1   5/2001 Fan et al. .................... 382/173
6,249,604 B1 * 6/2001 Huttenlocher et al. ....... 382/174
6,498,608 B1 * 12/2002 Dresevic et al. ............. 345/467
6,608,928 B1   8/2003 Queiroz ...................... 382/173
7,043,080 B1 * 5/2006 Dolan ......................... 382/199

* cited by examiner

*Primary Examiner*—Duy M Dang
(74) *Attorney, Agent, or Firm*—R. Hutter

(57) ABSTRACT

In an image processing system, successive segmentation steps are carried out. In the case of a "hole" in the segmentation result, which is defined as a small area of one type (such as black) within a slightly larger "island" of another type (such as white), a basic segmentation technique may result in an error. The error is avoided by retaining, for each distinct area in the image, a variable indicating whether the area has been "flipped" from one type to another in a previous processing operation.

6 Claims, 4 Drawing Sheets

SEGMENTATION OF IMAGE DATA

INCORPORATION BY REFERENCE

U.S. Pat. No. 6,240,205 is hereby incorporated by reference for the teachings therein.

TECHNICAL FIELD

The present disclosure relates to technique for organizing and segmenting image data, as would be useful in, for example, digital scanners, cameras or printers.

BACKGROUND

Image data is often stored in the form of multiple scanlines, each scanline comprising multiple pixels. When processing this type of image data, it is helpful to know the type of image represented by the data. For instance, the image data could represent graphics, text, a halftone, condone, or some other recognized image type. A page of image data could be all one type, or some combination of image types.

It is known in the art to take a page of image data and to separate, or "segment," the image data into windows of similar image types. For instance, a page of image data may include a halftone picture with accompanying text describing the picture. In order to efficiently process the image data, it is desirable to segment the pictorial area from text area. Processing of the page of image data can then be efficiently carried out by tailoring the processing to the type of image data being processed based on the segmentation result.

One common overall method for performing image segmentation is the use of a "mixed-raster content" or MRC representation of image data. There are several variations of MRC representation, as shown for example in FIG. 1. The representation typically comprises three independent planes: foreground (FG), background (BG), and a selector (SEL) plane. The background plane is typically used for storing continuous-tone information such as pictures and/or smoothly varying background colors. The selector plane normally holds the image of text (binary) as well as other edge information (e.g., line art drawings). The foreground plane usually holds the color of the corresponding text and/or line art. The content of each of the planes may be defined appropriately by an implementation of the MRC representation.

FIG. 2A is an example separation-plane image before MRC processing, and FIG. 2B is an example initial segmentation result from FIG. 2A. FIG. 2B shows how certain types of original images yield complicated selector plane images. In the FIG. 2B illustration, ideally all selector plane pixels should have the same value and thus be considered part of the same type of image data, because all of the pixels are part of the same photograph. However, the initial segmentation of this single image area has much error, which is caused by relatively large, uniform light or dark areas within the photograph: a standard segmentation algorithm will erroneously recognize those portions of the photograph, shown in black in FIG. 2B, as belonging to another type of image, such as a uniform color area. The mischaracterization of image types can lead to the subsequent employment different processing methods (some lossless, others lossy) for the same photograph region.

In segmentation of MRC image data to yield a selector plane, as well as in other activities with any kind of image data, a kind of error of segmentation is called the "hole" problem. A "hole" in an initial segmentation result (such as a selector plane in the three layer MRC case) can be defined as a small area associated with a first subset or type of image data surrounded by a greater "island" of pixels associated with a second subset or type of image data, the island in turn being substantially surrounded by a greater area associated with the first subset. As will be described in detail below, the presence of such holes in image data, such as in an MRC image plane, can lead to special problems of misclassification of portions of the image data.

PRIOR ART

U.S. Pat. No. 6,240,205 gives a general description of segmenting and classifying image data, including steps of separating each scanline of image data into edges and image runs and classifying each of the edges and image runs as standard image types.

U.S. Pat. Nos. 5,778,092 and 6,608,928 disclose examples of processing MRC image planes.

SUMMARY

There is provided a method of processing image data, the image data including a first subset of the image data and a second subset of the image data. Holes associated with the first subset image data, surrounded by islands associated with the second subset image data, the islands being substantially surrounded by greater area associated with the first subset, are identified in the image data.

There is further provided a method of processing image data, the image data describing runs and windows in an image. For the image data, there is maintained a set of window data structures associated with windows in the image, each of the window data structures including a history variable indicative of whether the image data associated therewith has been previously altered.

DETAILED DESCRIPTION

In the following detailed description, a method of processing image data will be specifically described with regard to a mixed-raster content (MRC) selector plane, but it will be understood that the method can be applied to the processing of any type of image data for any purpose.

Figure 1:
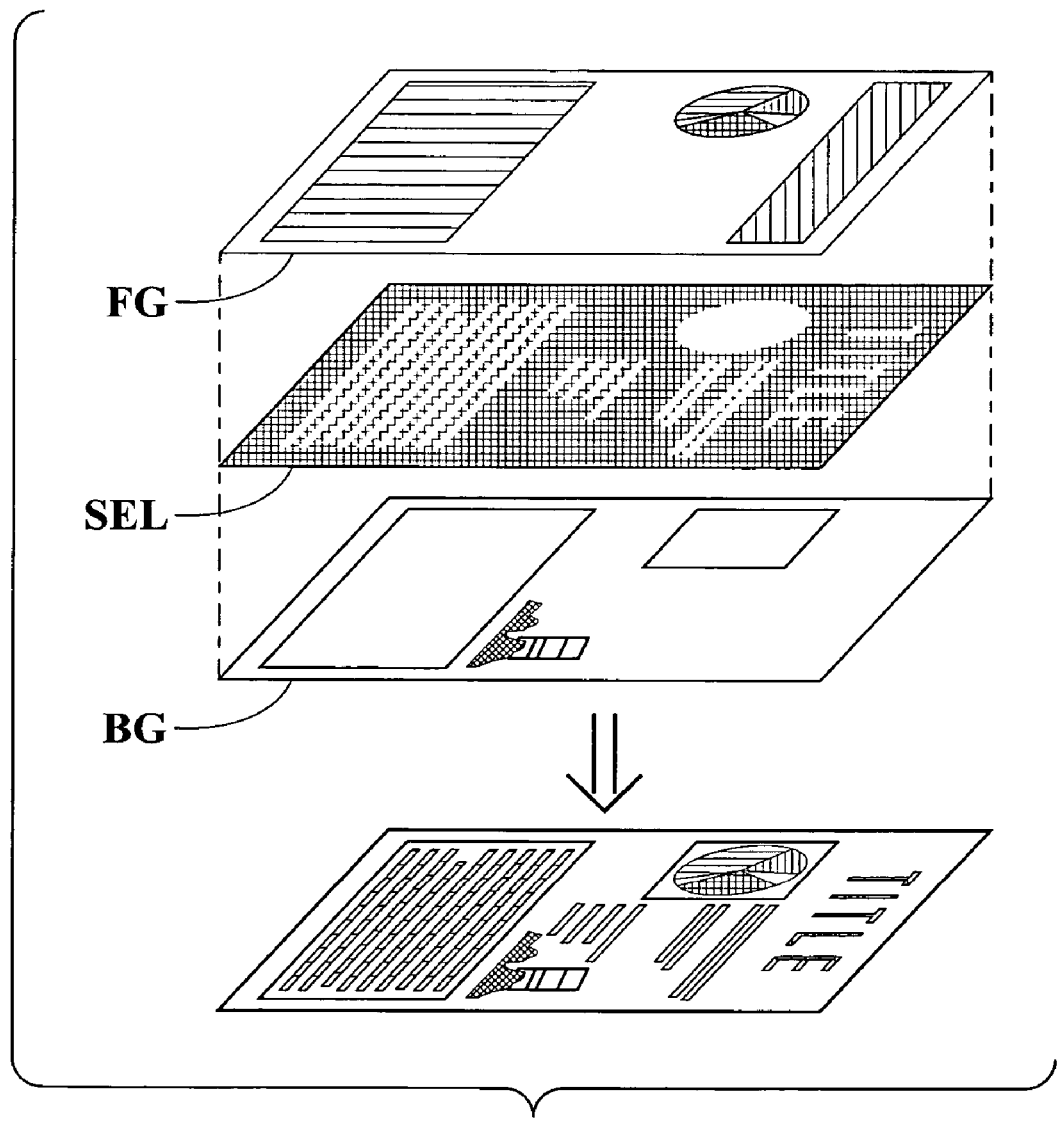
FIG. 1 is a diagram showing a principle of MRC image rendering, as known in the prior art.
Figure 2A:
FIG. 2A is an example image before segmentation.
Figure 2B:
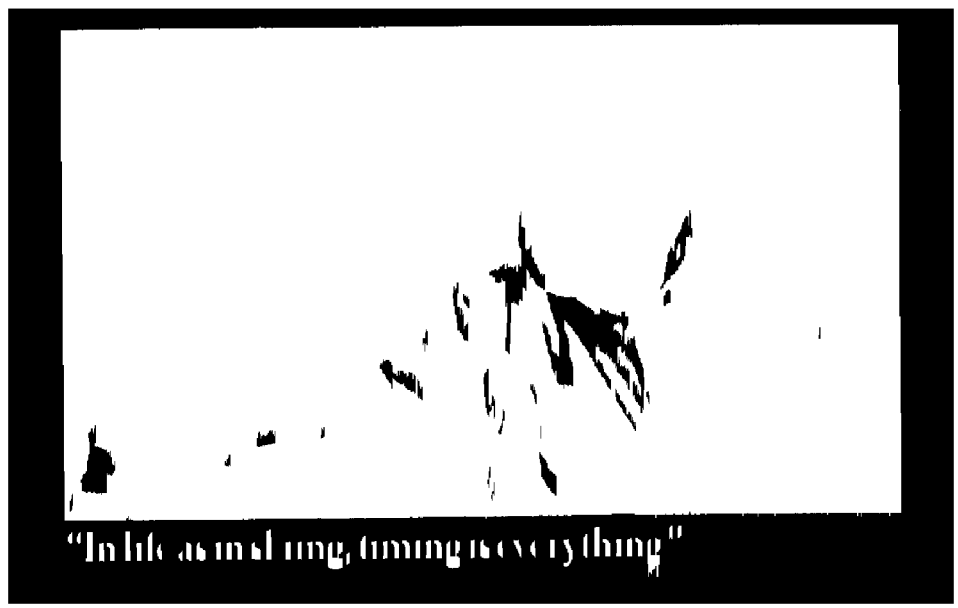
FIG. 2B is the MRC selector plane image after initial segmentation processing of the example image in FIG. 2A.
Figure 3A:
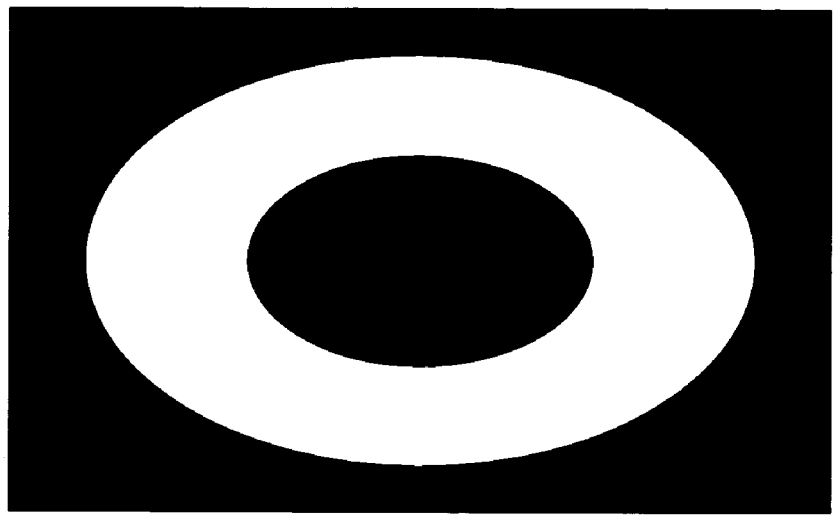
FIGS. 3A-3B show example simple images, illustrating a principle of a described embodiment.
Figure 3B:
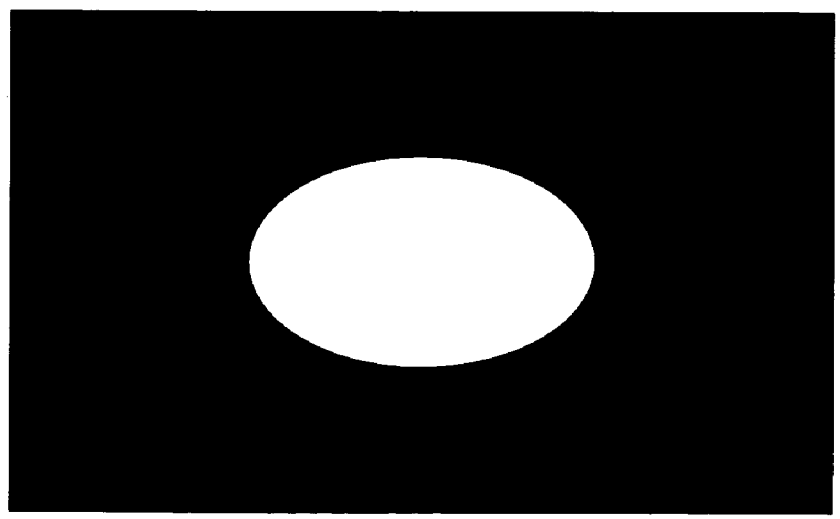

FIGS. 3A-3B show example simple images, in effect simplified versions of the selector plane example of FIG. 2B. FIG. 3A shows what can be considered a "hole" in a selector plane: the central black oval is surrounded by a white island, and the island is in turn surrounded by a greater black area, forming the balance of the rectangular image. In this case, the central black area is considered a hole because it is surrounded by an island of white area, which in turn is surrounded by a greater black area. (In this example, it is unimportant whether the white or black area is associated with the foreground or background plane in an MRC rendering.)

As part of an algorithm to simplify the selector plane, as described above, a typical action is to identify unconnected shapes or "islands" in a segmentation result, and if the island is smaller than a certain threshold size, "flip" the segmentation result (i.e., change the pixels in selector plane from their original black to white, or vice-versa) in the island to assume the image type of its surrounding pixels. The hole can have tens of thousands of pixels depending on the resolution of the image.

In a general case, the flipping will effectively erase the island; for example, a small island of black pixels surrounded by white pixels will be "flipped" to be white pixels and thus disappear. A problem occurs with a hole within an island, as in FIG. 3A, where the central black oval and the surrounding white oval are both small enough to be "flipped" in a simplification process. If both ovals are thus flipped, the resulting revised image will appear as in FIG. 3B: the center oval/hole will flip from black to white, but the surrounding oval, the "island," will flip from white to black, leaving an even smaller island where the original hole was. This result, of course, will cause the essential problem of a small, unconnected island to remain.

According to the present embodiment, the "hole" problem of FIGS. 3A and 3B is addressed as follows. When the hole is identified within the image data (and, in some cases, meets other possible qualifications such as being within a size range specifying minimum and/or maximum size), flipping of the pixels in the hole is suppressed during a general simplification algorithm, so that only the pixels of the island around the hole are flipped. Or, when an image being processed includes a "hole" as defined, the image data is altered so that the entire area within the island, including the hole, is caused to blend in with the greater area, so that no evidence of the original hole remains. This can be done by effectively causing the pixels in the hole to become of the same type as the pixels in the island, whether by changing the type of the pixels in the hole, or suppressing a change in type by the pixels in the hole when a change is mandated by an algorithm or process applied generally to the image data.

Figure 4:
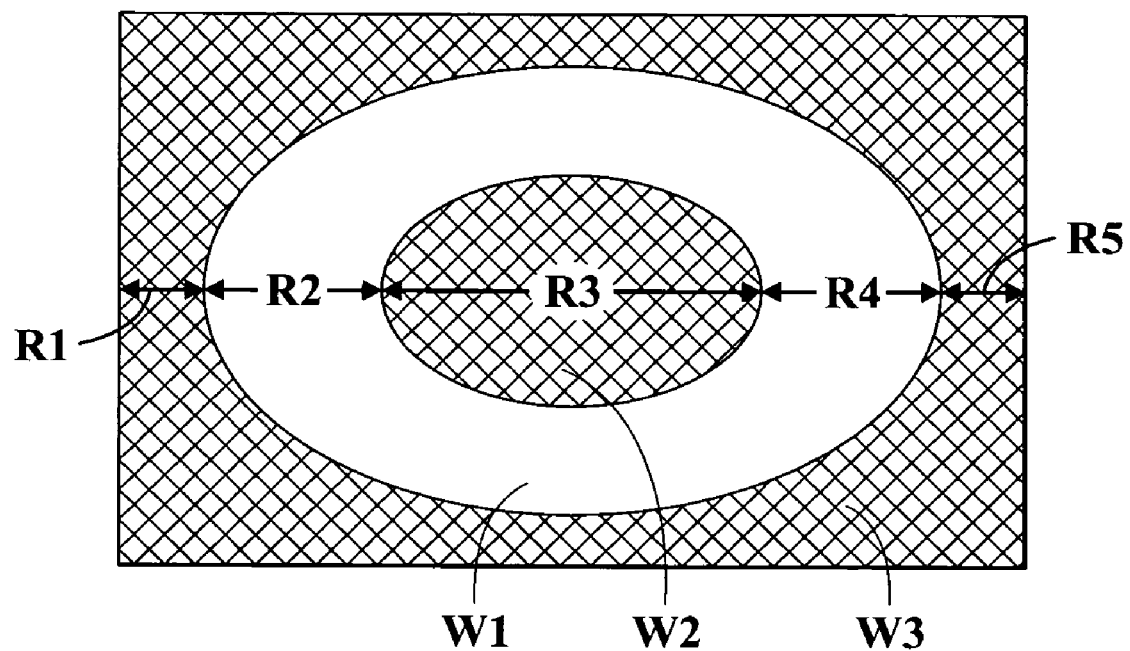
FIG. 4 shows an example simple image, annotated to explain an image processing method.

What follows is a description of one practical implementation of a method of overcoming the "hole" problem, with reference to FIG. 4. In FIG. 4, the ordinarily black areas are shown cross-hatched for clarity.

When an image, or image-like data set such as a selector plane, is processed, the pixel data is processed through a series of scanlines in the image, each scan line including a series of pixels, and the scanlines arranged next to each other forming a raster which creates the two-dimensional image. When the image data of a selector plane is processed on such a line-by-line basis, there can be identified "runs" of black or white pixels along each scanline. In FIG. 4, examples of such runs along one scanline are shown as R1, R2, R3, etc. Each run is assigned a data structure or object called a "line definition." For each run of black or white pixels such as R1, R2, R3, etc., in a scanline, the associated data structure includes, at least, an ID number, the state of the run (black or white, or 0 or 1), and the length (how many pixels) of the run. These data sets can be used to carry out various processes on the image data.

In addition to line definitions, another set of data structures is "window definitions." Window definitions describe unconnected areas (windows, which can be islands or holes) of black or white pixels in the selector plane. Examples of areas associated with window definitions are shown in FIG. 4 as W1, W2, and W3. Window definitions for a selector plane can be derived from the set of line definitions for the selector plane, by determining which line runs are adjacent each other in successive scan lines. In this way each unconnected area in an image is assigned a window definition data structure, as shown in the Figure. Each window definition includes, at least, an ID number, the state of the window (black or white, or 0 or 1), and the size (how many pixels) of the window. Further, according to this embodiment, each window definition includes a "history" variable, that records if that particular window has been "flipped" (as described above) in a previous operation: for example, for each window definition, the history variable will be 0 if the window has never been flipped, and 1 after the window has been flipped. By retaining the information about whether a particular window such as W1, W2, and W3 has previously been flipped, the above-described "hole problem" can be overcome.

A method for avoiding the "hole problem" can, with the above-described line definition and window definition data structures, be carried out in an on-the-fly basis by processing a series of line definitions forming a selector plane and cross-checking each line definition with its corresponding window definition. According to this method, all "runs" such as R1, R2, R3 within the selector plane are considered sequentially along a scanline. For any two adjacent runs within a single scanline, their corresponding window definitions are checked. If the two corresponding windows have are of different states AND they have BOTH been previously flipped from their original states (i.e., their history variables are BOTH 1), the state of the second of the two runs in the scanline is in effect reversed, or in other words the flipping of the state of the second of the two runs is suppressed if it is otherwise mandated by a generally-applied algorithm. This operation has the effect of overcoming the "hole problem" as described above.

The described embodiment can address, or be readily adapted to address, situations in which multiple island-and-hole relationships are cascaded, e.g., a hole within an island, the island surrounded by a greater area, the greater area being surrounded by, in effect, a more-greater area.

The invention claimed is:

1. A method of processing image data associated with an MRC selector plane, the image data including a first subset of the image data and a second subset of the image data, comprising:
    identifying in the image data a hole, a hole being an area associated with the first subset, the hole being substantially surrounded by an island associated with the second subset, and the island being substantially surrounded by a greater area associated with the first subset;
    altering the image data so that the hole becomes associated with the second subset; and
    maintaining, for at least a subset of image data associated with the hole, a data structure including a variable indicative of whether the image data has been previously altered.

2. The method of claim 1, further comprising
    applying a simplification algorithm to the image data; and
    suppressing alteration of image data associated with the hole during the applying step.

3. The method of claim 1, further comprising
    altering the image data if the hole is within a predetermined size range.

4. The method of claim 1, further comprising
    maintaining, for at least a subset of image data associated with the island, a data structure including a variable indicative of whether the image data has been previously altered.

5. The method of claim 1, wherein the greater area is substantially surrounded by a more-greater area associated with the second subset.

6. The method of claim 5, wherein the image data is associated with an MRC selector plane.

* * * * *